(No Model.)
T. C. GRAVES.
FRUIT CONVEYER.
No. 366,721. Patented July 19, 1887.
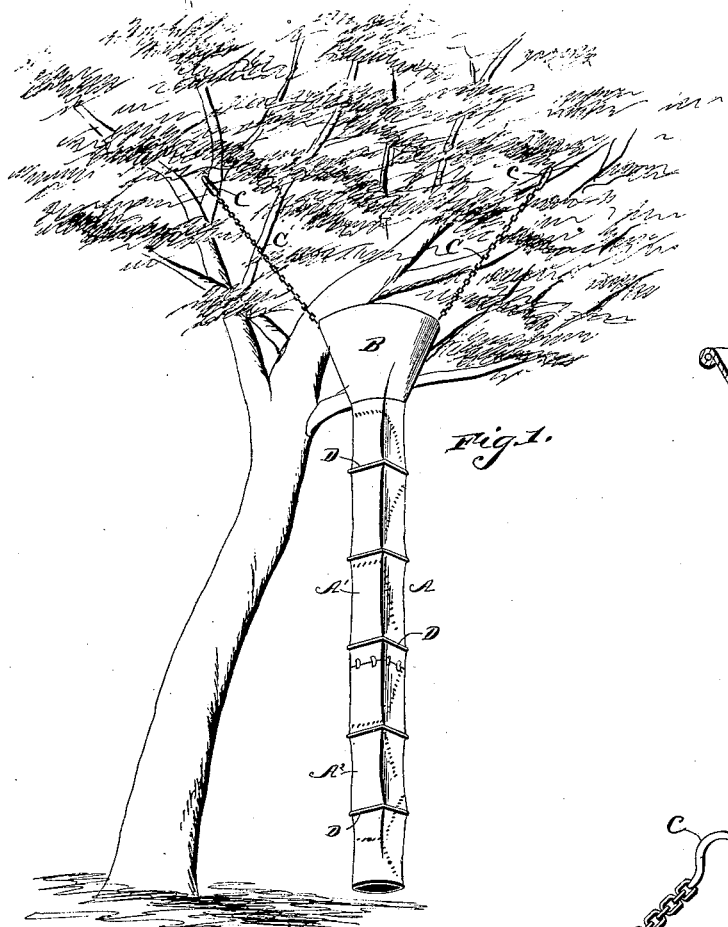
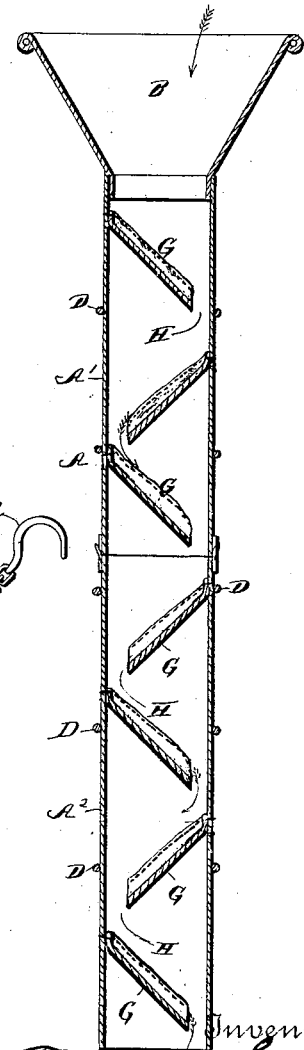
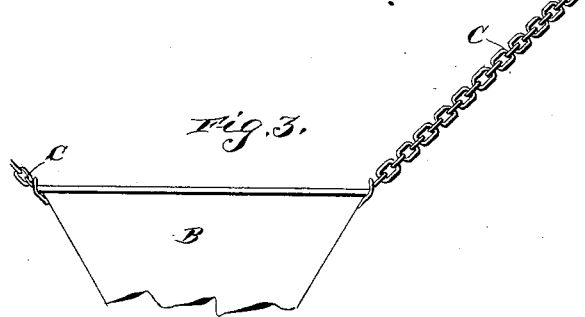
Witnesses:
Inventor
Thomas C. Graves
By his Attorneys,

UNITED STATES PATENT OFFICE.

THOMAS C. GRAVES, OF ASHLEY, ILLINOIS, ASSIGNOR OF ONE-HALF TO COLUMBUS H. HOUSE, OF SAME PLACE.

FRUIT-CONVEYER.

SPECIFICATION forming part of Letters Patent No. 366,721, dated July 19, 1887.

Application filed March 31, 1887. Serial No. 233,188. (No model.)

*To all whom it may concern:*

Be it known that I, THOMAS C. GRAVES, a citizen of the United States, residing at Ashley, in the county of Washington and State of Illinois, have invented a new and useful Improvement in Fruit-Conveyers, of which the following is a specification.

My invention relates to improvements in devices for conveying picked fruit safely from the tree to the ground, or to a receptacle thereon without bruising or otherwise damaging the same; and it consists in a certain novel construction and arrangement of parts for service, fully set forth hereinafter and specifically pointed out in the claim.

In the drawings, Figure 1 is a perspective view of the picker. Fig. 2 is a vertical section thereof. Fig. 3 is a detail view of the funnel-shaped mouth.

Referring by letter to the drawings, A designates the flexible tube or bag of the device (shown square in cross section in the drawings) and formed in sections $A'$ $A^2$, of convenient lengths, and buckled together, as shown, thus enabling the length of the said tube to be altered to suit the height of the tree. At the upper end of the said tube is secured a funnel-shaped mouth, B, adapted to be held extended by any preferred means, as a wire ring in the upper edge thereof, and C C are sustaining-chains secured at the lower ends to the said ring and provided at the upper ends with hooks $c$ $c$, to engage the limbs of the tree to suspend the conveyer in the desired position.

To hold the bag extended in the square shape, I employ the wire rods D D on the outside thereof, and placed at intervals down the entire length.

G G designate shelves or inclined planes set at an angle of about forty-five degrees in the tube, with the upper and side edges thereof secured by stitching to the sides of the said tube and having the lower edge free and a short distance from the adjacent side of the tube, thus providing openings or passages H H at the said points. The said inclined shelves are inclined alternately in opposite directions. Thus when an apple or other fruit is dropped into the mouth of the tube it will roll down the upper shelf and drop through the opening H to the next shelf below, and thus proceeding will reach the lower end of the tube and roll out upon the ground. Thus fruit may be picked very rapidly by persons in the tree and dropped into the receptacle or conveyer; and, as the entire tube and deflecting shelves are made of a flexible material, as duck or canvas, with no hard substances whatever in the path of the fruit, the said fruit will be carried safely to the ground.

The parts of the device are so constructed as to insure the downward passage of the fruit, and there are no unyielding or hard substances, as metal, &c., in any position to be touched in the descent, and the conveyer is adapted to swing loosely from the tree with the lower end of the tube close to the ground, thus enabling the apples or other fruit to be piled up on the ground without injury.

It will be understood that I do not limit myself to the precise construction herein shown and described, as I may make slight changes in the details thereof without departing from the spirit of the invention.

Having now described my invention, I claim—

A fruit-conveyer comprising a tube of flexible material, and a series of flexible oppositely-inclined shelves within the tube, having their rear and side edges secured thereto and their lower forward edges disconnected therefrom, leaving a space between said edges and the tube, substantially as specified.

In testimony that I claim the foregoing as my own I have hereto affixed my signature in presence of two witnesses.

THOMAS C. GRAVES.

Witnesses:
LUCILIUS C. MOSS,
WM. H. HOWARD.